Patented Dec. 8, 1936

2,063,620

UNITED STATES PATENT OFFICE 2,063,620

CELLULOSE ESTER COMPOSITIONS

Hans Persiel, Gerhard Balle, Franz Grom, and Rudolf Semmig, Frankfort-on-the-Main, Germany, assignors to I. G. Farbenindustrie Aktiengesellschaft, Frankfort-on-the-Main, Germany No Drawing. Application November 1, 1934, Serial No. 751,098. In Germany November 11, 1933

5 Claims. (Cl. 106—40)

The present invention relates to new compositions of matter being formed from the organic acid esters of cellulose.

No product has hitherto been available which imparts to the organic cellulose esters, besides a more or less great softness, a certain fullness in a similar manner as this can be attained in the case of nitrocellulose with a series of natural or artificial resins in combination with plasticizers, or particularly with phthalic acid glycerin resins containing fatty acid radicals. In the case of cellulose triacetate, one of the most interesting organic cellulose ester there has hitherto not been known any soft resin of a plasticizing action, nor any usual and useful gelatinizing agent or softening agent, because the softening agents, such as phthalic acid esters and phosphoric acid esters which are generally used in the case of the hydrolyzed cellulose acetates failed in the case of the triacetate.

We have now found that the oily to resinous condensation products as they are obtainable from ether dicarboxylic acids having the general formula:

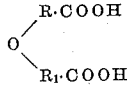

wherein R and R₁ each of them stands for a hydrocarbon residue, with polyhydric alcohols by heating the components are particularly suitable as softening agents for cellulose esters prepared from organic acids, especially for working up cellulose acetates so as to obtain bodies of all kinds, such as plastic masses, films, threads, layers, dressings, coatings, lacquers, paints and adhesive substances of all kinds. The new products thus fill up a great gap in the art and allow new and extensive applications of the cellulose esters in view of the particular advantages they possess in comparison with nitrocellulose, for instance, their non-inflammability, fastness to light etc. It is extremely surprising that the plastic masses obtained with the named products show with the usual additions a considerably inferior decrease of strength in comparison with former masses prepared with liquid gelatinizing agents.

The afore-named products may be added to the cellulose esters in a quantity up to 200 per cent., and sometimes even more, of the cellulose derivatives; the bodies prepared from these mixtures have no moist or sticky surface. These masses are extremely fast to aging, even at temperatures above 100° C., and very resistant to actions of various kinds, for instance, ultraviolet rays.

With particular advantage there may be used the esters of diglycollic acid, of methyl-diglycollic acid, of dihydracrylic acid with glycols, glycerin, polyglycols, erythrite and other polyhydric alcohols, or with the ethers thereof if they still possess more than one free hydroxyl group. The ester-like condensation products from diglycollic acid with 1.3-butylene glycol are particularly distinguished by their capability of being mixed to a large extent, as described above, with acetyl cellulose, by a substantially unlimited stability and a complete fastness to light.

Among the various acetyl celluloses of commerce there may be used the so-called secondary acetates soluble in acetone and the so-called primary acetate or triacetate soluble in chloroform; furthermore, mixed esters, such as cellulose butyro-acetates, and similar derivatives. It may be pointed out that the condensation products mentioned above first allowed of working up the cheap triacetate to a large extent.

The named ester-like condensation products together with the just mentioned film-forming substances may be applied to a great variety of purposes. There may be cited, for instance, the use for the preparation of cellulose ester varnishes and films, not only for the manufacture of cast films, but also for the manufacture of films cut from blocks, for packing and photographic purposes etc., for the preparation of artificial threads, for the preparation of spraying masses and moulding mixtures or moulding powder (for instance for flexible gramophone disks) as an intermediate layer for splinter-proof glass and so on.

The following examples serve to illustrate the invention, but they are not intended to limit it thereto, the parts being by weight:

1. 25 parts of cellulose acetate and 30 parts of a viscous condensation product from 1.3-butylene-glycol and diglycollic acid are dissolved in 75 parts of acetone or a substituent of acetone. With the aid of the solution thus obtained a film is cast in known manner. In spite of its great dilatability, this film is very resistant to tearing and maintains its excellent properties even after having been heated for many days to 100° C.

2. The solution obtained according to Example 1 is dyed in known manner and used, after a suitable dilution, as varnish for cables. The lacquer coating is resistant to water, benzine and oil. It remains highly elastic even after having been heated for days to 100° C.

3. A film is prepared from 12 parts of cellulose triacetate and 10 parts of the viscous condensation product named in Example 1, dissolved in 65 parts of methylene chloride and 13 parts of methanol. This film is waterproof, extremely elastic and resistant to creasing and is particularly suitable for wrapping purposes, and the like.

4. If, in the afore-named batch the condensation product from diglycollic acid and 1.3-butylene-glycol is replaced by a condensation product from diglycollic acid and dimethoxy-octylene-glycol, there is obtained a film of a particularly high elasticity.

5. A varnish prepared from 8 parts of cellulose butyroacetate, 6 parts of a viscous condensation product from diglycollic acid and 1.3-butylene-glycol, 12 parts of methyl-glycol-acetate, 36 parts of ethyl-acetate and 38 parts of acetone or a substituent of acetone may serve as an aeroplane varnish which is waterproof and resistant to atmospheric conditions.

6. Instead of the condensation product from diglycollic acid and 1.3-butylene-glycol named in Example 5 there is used a likewise viscous reaction product from diglycollic acid and dibutylene-glycol. A varnish is thus obtained which possesses a particularly high resistance to moisture.

7. For the preparation of splinterproof glass there is used an intermediate layer from 100 parts of cellulose acetate and—according to the mechanical properties desired of the safety glass—about 20 to 200 parts of a viscous condensation product from diglycollic acid and 1.3-butylene-glycol.

8. From 100 parts of cellulose acetate and about 20 to 80 parts of a viscous condensation product from diglycollic acid and 1.3-butylene-glycol there is prepared in known manner a moulding powder which is suitable for moulding and spraying purposes. The shaped bodies made therefrom are extremely resistant to aging.

9. An insulating film is made according to known methods in a similar manner as described in Example 1 from 8 parts of cellulose acetate and 4 parts of a viscous condensation product from diglycollic acid and 1.3-butylene-glycol. The film is waterproof and resistant to oil.

10. Films prepared from 100 parts of cellulose acetate and 20 to 30 parts of a viscous condensation product from diglycollic acid and 1.3-butylene-glycol may be used for the preparation of photographic layer carriers of all kinds, because they show no loss of strength in comparison to pure cellulose acetate, possess a very small power of swelling in water and adhere well to the light-sensitive layer or any intermediate layer.

11. A very resistant lacquer for coating aeroplanes is obtained by dissolving 8 parts of cellulose-acetobutyrate and 6 parts of a viscous condensation product from dilactic acid and octylene-glycol in the solvent named in Example 3.

We claim:

1. A composition of matter comprising a cellulose ester component and a softening agent, said cellulose ester component consisting predominantly of organic acid esters, said softening agent comprising a condensation product of an ether-dicarboxylic acid with a polyhydric alcohol including the ethers of the alcohol having more than one free hydroxyl group, in sufficient proportion to impart elasticity, resistance to tearing, and resistance to creasing to a film formed of said composition.

2. A composition of matter comprising a cellulose ester component and a softening agent, said cellulose ester component consisting predominantly of organic acid esters, said softening agent comprising a condensation product of an aliphatic ether-dicarboxylic acid with a polyhydric alcohol including the ethers of the alcohol having more than one free hydroxyl group, in sufficient proportion to impart elasticity, resistance to tearing, and resistance to creasing to a film formed of said composition.

3. A composition of matter comprising a cellulose ester component and a softening agent, said cellulose ester component consisting predominantly of organic acid esters, said softening agent comprising a condensation product of a diglycollic acid with a polyhydric alcohol including the ethers of the alcohol having more than one free hydroxyl group, in sufficient proportion to impart elasticity, resistance to tearing, and resistance to creasing to a film formed of said composition.

4. A composition of matter comprising a cellulose ester component and a softening agent, said cellulose ester component consisting predominantly of an acetic acid ester, said softening agent comprising a condensation product of a diglycollic acid with a polyhydric alcohol including the ethers of the alcohol having more than one free hydroxyl group, in sufficient proportion to impart elasticity, resistance to tearing, and resistance to creasing to a film formed of said composition.

5. A composition of matter consisting essentially of 12 parts of cellulose triacetate, 10 parts of a viscous condensation product from 1.3-butylene-glycol and diglycollic acid, 65 parts of methylene chloride, and 13 parts of methanol, adapted to form a film which is waterproof, extremely elastic and resistant to creasing.

HANS PERSIEL.
GERHARD BALLE.
FRANZ GROM.
RUDOLF SEMMIG.